United States Patent

[19] Lauk

[11] Patent Number: 5,997,587
[45] Date of Patent: Dec. 7, 1999

[54] AZO DYE MIXTURES, AZO DYES, PROCESSES FOR THEIR PREPARATION, AND THEIR USE

[75] Inventor: Urs Lauk, Zürich, Switzerland

[73] Assignee: Ciba Specialty Chemicals Corporation, Tarrytown, N.Y.

[21] Appl. No.: 09/038,390

[22] Filed: Mar. 11, 1998

[30] Foreign Application Priority Data

Mar. 13, 1997 [CH] Switzerland ................ 608/97

[51] Int. Cl.$^6$ .................... D06P 3/874
[52] U.S. Cl. ...................... 8/532; 8/641; 8/918
[58] Field of Search ................ 8/532, 918–924, 8/641; 534/806, 808

[56] References Cited

U.S. PATENT DOCUMENTS 4,300,904  11/1981  Blanchard .................... 8/532

FOREIGN PATENT DOCUMENTS 217532   8/1983   Germany .

OTHER PUBLICATIONS

Derwent Abst. 83–824076/47 and Chem. Abst. 100: 193739n of J 58176273 Oct. 1983.

Derwent Abst. 89–044055/06 and Chem. Abst. 111: 80107p of J 3317569a Dec. 1988.

(List continued on next page.)

*Primary Examiner*—Margaret Einsmann
*Attorney, Agent, or Firm*—David R. Crichton; Jacob M. Levine

[57] ABSTRACT

Dye mixtures comprising at least one dye of the formula (1)

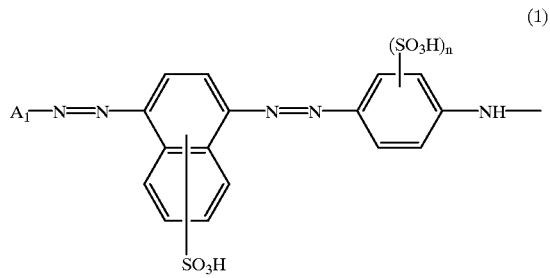

(1)

-continued

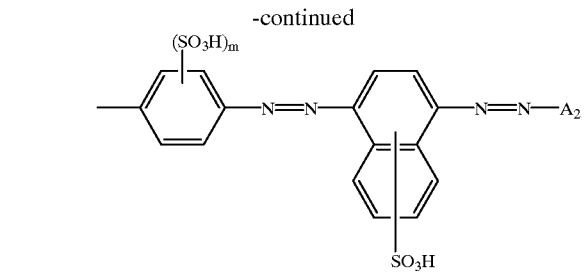

together with at least one dye of the formula (2) or (3)

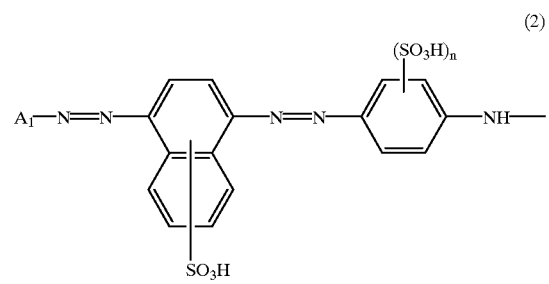

(2)

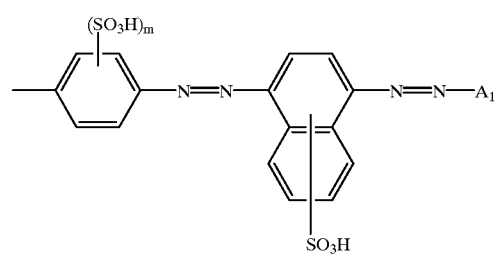

or

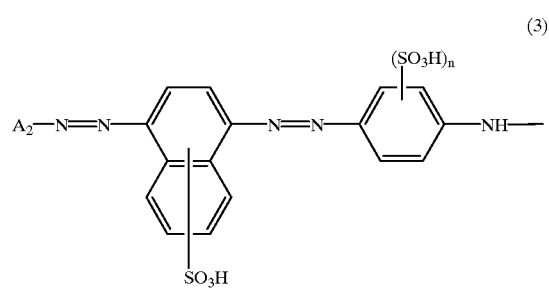

(3)

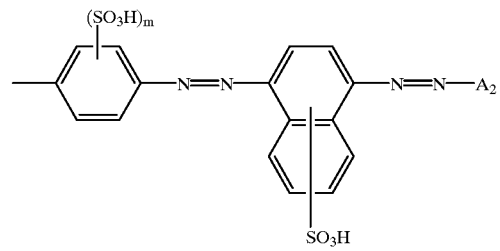

in which the substituents are as defined in claim 1 are direct dyes for cellulosic fibre materials in particular. They are stable at high temperatures and are particularly suitable for the one-bath, single-stage dyeing of polyester/cotton blends with a disperse dye for the polyester fibres under the dyeing conditions for polyester fibres.

15 Claims, No Drawings

OTHER PUBLICATIONS

Derwent Abst. 85–116528/20 and Chem. Abst. 103; 106299q for DD217532 Aug. 1983.

The Chemistry of Synthetic Dyes, vol. VI, pp. 211–297, 1972.

*Colour Index* vol. 2 pp. 2005,2006,2285 published by the Society of Dyers and Colourists, 1971.

AZO DYE MIXTURES, AZO DYES, PROCESSES FOR THEIR PREPARATION, AND THEIR USE

The present invention relates to novel mixtures of azo dyes, to novel azo dyes, to processes for their preparation and to their use for dyeing and printing fibre materials, especially textile fibre materials.

The object on which the present invention is based was to find dye mixtures and dyes that are suitable for dyeing nitrogen-containing and hydroxyl-containing fibre materials, especially cellulosic fibre materials, have good fastness properties and are stable at high temperatures.

It has now been found that the azo dye mixtures and azo dyes set out below go a very long way towards meeting these requirements.

The present invention accordingly provides dye mixtures comprising at least one dye of the formula (1)

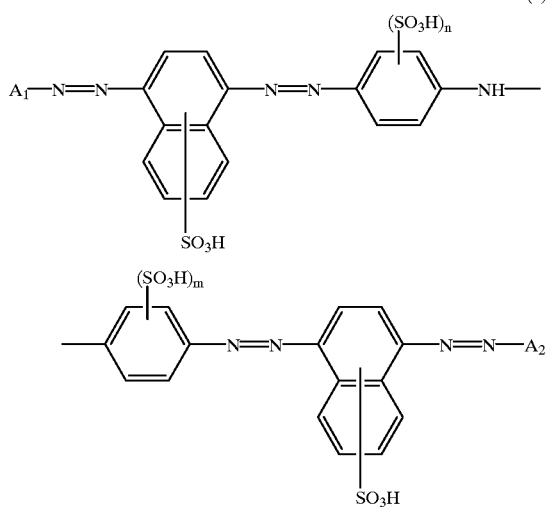

together with at least one dye of the formula (2) or (3)

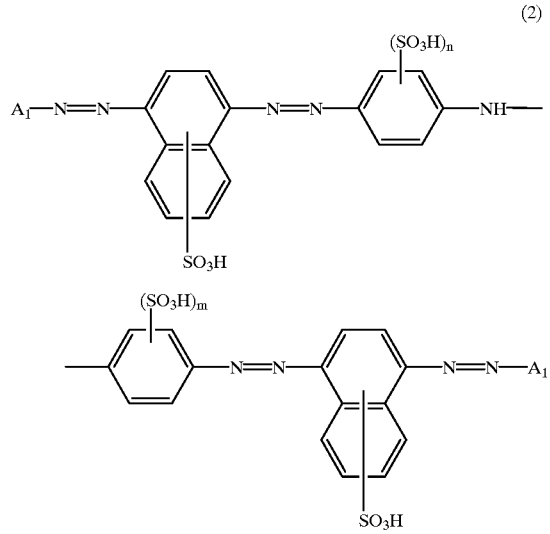

or

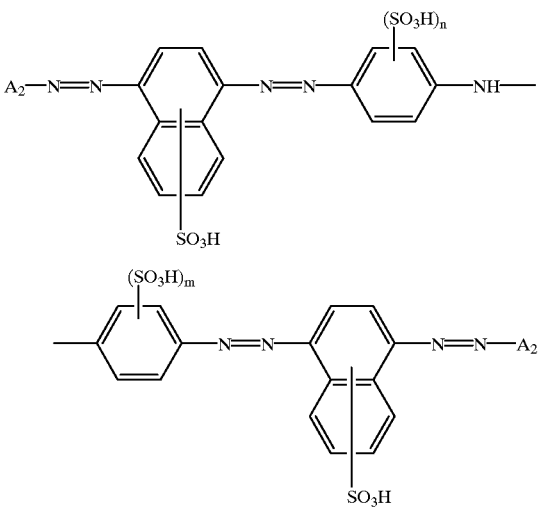

in which $A_1$ and $A_2$ independently of one another are each the radical of a coupling component of the benzene or naphthalene series or of the heterocyclic series and n and m are 0 or 1.

The coupling components $A_1$–H and $A_2$–H on which the compounds of the formulae (1), (2) and (3) are based are known per se and are described in large number in, for example, Venkataraman "The Chemistry of Synthetic Dyes" Volume 6, pages 213–297, Academic Press, New York, London 1972.

$A_1$ and $A_2$ independently of one another are each preferably the radical of a benzene, naphthalene, pyrazolone, aminopyrazole, pyridone, pyrimidine, indole, naphthylimidazole, diphenylamine, pyrazolo[2,3-a] pyrimidine or tetrahydroquinoline coupling component, it being possible for these radicals to be substituted further.

$A_1$ and $A_2$ independently of one another are each with particular preference a benzene, naphthalene, 6-hydroxy-2-pyridone, 1-phenyl-5-aminopyrazole, 1-phenyl-5-pyrazolone or indole radical. With very particular preference, $A_1$ and $A_2$ independently of one another are each a benzene, naphthalene, 1-phenyl-5-pyrazolone or indole radical, especially a benzene, naphthalene or indole radical and, preferably, a naphthalene or indole radical. Naphthalene radicals are of particular interest.

Examples that may be mentioned as substituents of the radical $A_1$ or $A_2$ are the following: $C_1$–$C_6$alkyl, meaning generally methyl, ethyl, n- or iso-propyl, n-, iso-, sec- or tert-butyl or straight-chain or branched pentyl or hexyl; $C_1$–$C_4$alkoxy, meaning generally methoxy, ethoxy, n- or iso-propoxy or n-, iso-, sec- or tert-butoxy, hydroxy-$C_1$–$C_4$alkoxy; phenoxy; unsubstituted or e.g. hydroxy- or methoxy-substituted $C_2$–$C_8$alkanoylamino, such as acetylamino, hydroxyacetylamino, methoxyacetylamino or propionylamino; naphthoylamino or benzoylamino, unsubstituted or substituted in the aryl moiety by hydroxy or methoxy, for example; $C_2$–$C_8$alkoxycarbonylamino, unsubstituted or substituted in the alkyl moiety by hydroxy, methyl or methoxy, for example; phenoxycarbonylamino, unsubstituted or substituted in the phenyl moiety by hydroxy, methyl or methoxy, for example; amino; substituents N-$C_1$–$C_4$alkyl- or N,N-di-$C_1$–$C_4$alkylamino, unsubstituted or substituted in the alkyl moiety by hydroxy, $C_1$–$C_4$alkoxy, carboxyl, cyano, halogen, sulfo, sulfato, phenyl or. sulfophenyl, for example, such as methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)amino, N-(β-sulfoethyl)-N-benzylamino; cyclohexylamino; N-phenylamino or N-$C_1$–$C_4$alkyl-N-phenylamino, unsubstituted or substituted in the phenyl moiety by $C_1$–$C_4$alkyl, $C_1$–$C_4$alkoxy, carboxyl, halogen or sulfo, for example; $C_2$–$C_4$alkoxycarbonyl, for example methoxy- or ethoxycarbonyl; trifluoromethyl; nitro; cyano; halogen, meaning generally, for example, fluorine, bromine or, in particular, chlorine; ureido; hydroxyl; carboxyl; sulfo; sulfomethyl; carbamoyl; sulfamoyl; N-phenylsulfamoyl or N-$C_1$–$C_4$alkyl-N-phenylsulfamoyl, unsubstituted or substituted in the phenyl moiety by sulfo or carboxyl; or methyl- or ethylsulfonyl.

In a particular embodiment of the present invention, $A_1$ and $A_2$ independently of one another are each a radical of the formula (4), (5) or (6)

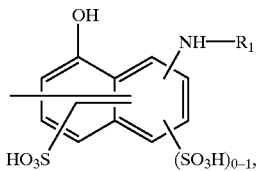

(4)

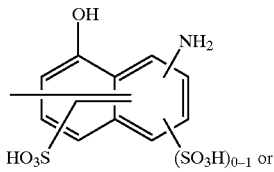

(5)

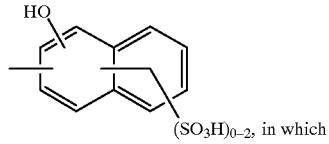

(6)

$R_1$ is substituted or unsubstituted phenyl or naphthyl or is a radical of the formula —CO—R, where R is substituted or unsubstituted $C_1$–$C_6$alkyl, $C_1$–$C_6$alkoxy, $C_5$–$C_7$cycloalkyl, phenyl, phenoxy or naphthyl, and n and mare 0 or 1.

Examples of $C_1$–$C_6$alkyl for R are methyl, ethyl, propyl, isopropyl, butyl, sec-butyl, tert-butyl, isobutyl, pentyl or hexyl, especially $C_1$–$C_4$alkyl, preferably methyl or ethyl and, with very particular preference, methyl. These alkyl radicals can be unsubstituted or substituted further by, for example, hydroxyl, $C_1$–$C_4$alkoxy, carboxyl, cyano, sulfo, sulfato or halogen.

The definition sulfo embraces generally the free acid form (—$SO_3H$) and the salt form, with alkali metal salts (Li, Na, K) or ammonium salts being particularly suitable.

Examples of $C_1$–$C_6$alkoxy for R are methoxy, ethoxy, propoxy, isopropoxy, butoxy, isobutoxy, pentyloxy or hexyloxy, especially $C_1$–$C_4$alkoxy, preferably methoxy. These alkoxy radicals can be unsubstituted or substituted further by, for example, hydroxyl, $C_1$–$C_4$alkoxy, carboxyl, cyano, sulfo, sulfato or halogen.

Examples of $C_5$–$C_7$cycloalkyl for R are cyclopentyl, cyclohexyl or cycloheptyl, and especially the cyclohexyl radical. These cycloalkyl radicals can be unsubstituted or can be substituted, for example, by $C_1$–$C_4$alkyl, $C_1$–$C_4$alkoxy, carboxyl or halogen, especially methyl.

Suitable phenyl, phenoxy or naphthyl radicals for R, in addition to the corresponding unsubstituted radicals, are the radicals substituted, for example, by $C_1$–$C_4$alkyl, $C_1$–$C_4$alkoxy, ureido, carboxyl, $C_2$–$C_4$alkanoylamino, sulfo or halogen.

R is preferably unsubstituted or hydroxyl-, $C_1$–$C_4$alkoxy-, sulfo-, sulfato- or halogen-substituted $C_1$–$C_6$alkyl or $C_1$–$C_6$alkoxy; unsubstituted or $C_1$–$C_4$alkyl- or halogen-substituted $C_5$–$C_7$cycloalkyl, or unsubstituted or $C_1$–$C_4$alkyl-, $C_1$–$C_4$alkoxy-, sulfo- or halogen-substituted phenyl, phenoxy or naphthyl.

With particular preference, R is unsubstituted or hydroxyl-, $C_1$–$C_4$alkoxy- or halogen-substituted $C_1$–$C_6$alkyl or $C_1$–$C_6$alkoxy or unsubstituted or $C_1$–$C_4$alkyl-, $C_1$–$C_4$alkoxy-, sulfo- or halogen-substituted phenyl or phenoxy.

With very particular preference R is $C_1$–$C_4$alkyl, especially methyl or ethyl, $C_1$–$C_4$alkoxy, especially methoxy or ethoxy, or phenyl.

Suitable phenyl or naphthyl radicals for $R_1$, in addition to the corresponding unsubstituted radicals, are the radicals substituted, for example, by $C_1$–$C_4$alkyl, $C_1$–$C_4$alkoxy, ureido, carboxyl, nitro, $C_2$–$C_4$alkanoylamino, sulfo or halogen.

$R_1$ is preferably unsubstituted or $C_1$–$C_4$alkyl-, $C_1$–$C_4$alkoxy-, $C_2$–$C_4$alkanoylamino-, nitro-, halogen-, carboxyl- or sulfo-substituted phenyl or naphthyl or is a radical of the formula —CO—R, where R is unsubstituted or hydroxyl-, $C_1$–$C_4$alkoxy- or halogen-substituted $C_1$–$C_6$alkyl or $C_1$–$C_6$alkoxy or is unsubstituted or $C_1$–$C_4$alkyl-, $C_1$–$C_4$alkoxy-, sulfo- or halogen-substituted phenyl or phenoxy.

With particular preference $R_1$ is unsubstituted or $C_1$–$C_4$alkyl-, $C_1$–$C_4$alkoxy-, halogen- or sulfo-substituted phenyl, especially phenyl, or is a radical of the formula —CO—R, where R is $C_1$–$C_4$alkyl, especially methyl or ethyl, $C_1$–$C_4$alkoxy, especially methoxy or ethoxy, or phenyl.

In a very particular embodiment of the present invention, $A_1$ and $A_2$ independently of one another are each a radical of the formula (4a), (5a), (6a) or (6b)

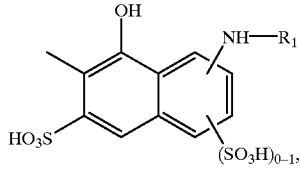

(4a)

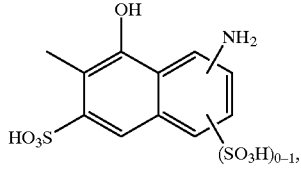

(5a)

-continued

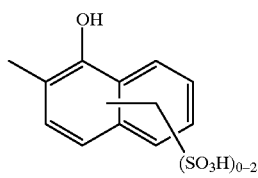
(6a)

or

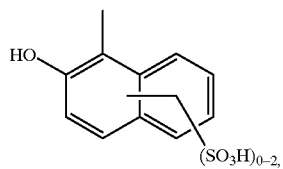
(6b)

in which $R_1$ is subject to the above definitions and preferences.

Preference is given to dye mixtures comprising at least one dye of the formula (1a)

in which the sulfo groups of the naphthalenesulfonic acid components independently of one another are each attached in position 6 or 7, $A_1$ and $A_2$ independently of one another are each a radical of the formula (4a), (5a), (6a) or (6b), preferably each a radical of the formula (4a), (5a) or (6b), $R_1$ is unsubstituted or $C_1$–$C_4$alkyl-, $C_1$–$C_4$alkoxy-, halogen- or sulfo-substituted phenyl, preferably phenyl, or is a radical of the formula —CO—R, where R is methyl, ethyl, methoxy, ethoxy or phenyl, preferably methyl, ethyl or phenyl, and the sum of n and m is 0 or 1.

Particular preference is given to dye mixtures comprising at least one dye of the formula (1a) together with at least one dye of the formula (2a) and at least one dye of the formula (3a).

In the dye mixtures of the invention the radicals $A_1$ and $A_2$ have different definitions.

The present invention also provides a process for preparing the dye mixtures of the invention, which comprises diazotizing a compound of the formula (7)

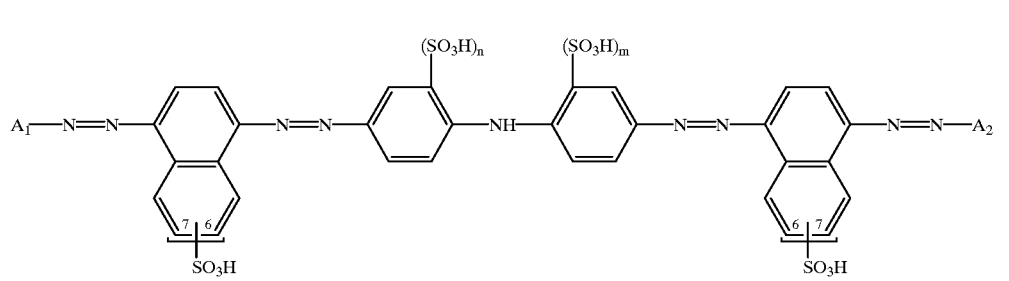
(1a)

together with at least one dye of the formula (2a) or (3a)

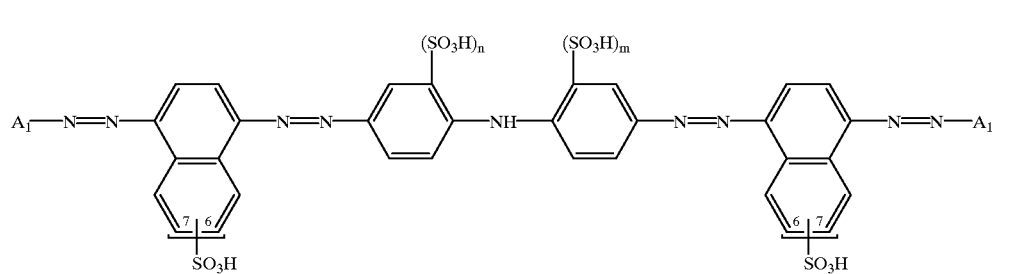
(2a)

or

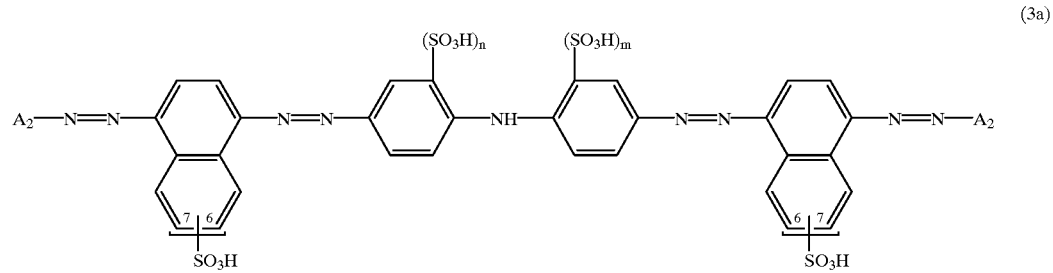
(3a)

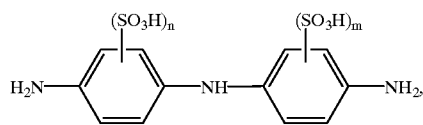 (7)

coupling the product with a compound of the formula (8)

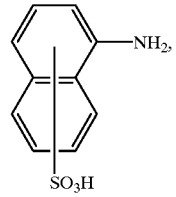 (8)

diazotizing the resulting compound of the formula (9)

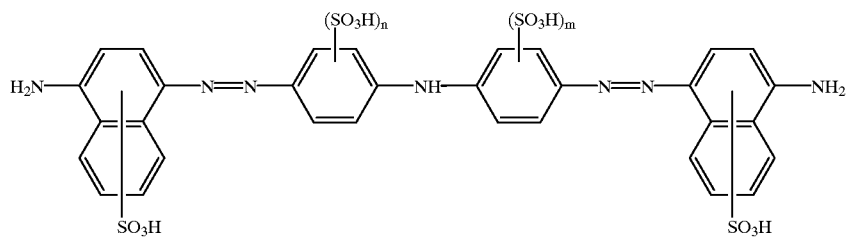 (9)

and coupling the product with the compounds of the formulae (10) and (11)

 $A_1$—H  (10)

and

 $A_2$—H  (11)

where $A_1$ and $A_2$, n and m are each subject to the above conditions and preferences.

The compounds of the formulae (7) and (9) are diazotized in a manner known per se, for example with a nitrite, such as with an alkali metal nitrite such as sodium nitrite, in a mineral acid medium, for example in a hydrochloric acid medium, at temperatures of, for example, from −5 to 40° C. and, preferably, from −5 to 10° C.

Coupling onto the coupling components of the formulae (8), (10) and (11) takes place in a manner known per se at an acidic or neutral to weakly alkaline pH, for example a pH of 5 to 10, and at temperatures of, for example, from −5 to 40° C., preferably from 0 to 30° C.

The compounds of the formulae (7), (8), (10) and (11) are known or can be prepared in analogy to known compounds.

Preferred coupling components of the formula (8) are 1-aminonaphthalene-6-sulfonic acid, 1-aminonaphthalene-7-sulfonic acid, the mixtures of these compounds or the isomer mixture obtained in the synthesis of these compounds, consisting of 1-aminonaphthalene-6-sulfonic acid and 1-aminonaphthalene-7-sulfonic acid.

One particular embodiment of the process for preparing the dye mixtures of the invention comprises diazotizing a compound of the formula (7) and coupling the product in succession, or in any desired order, with compounds of the formulae (8a) and (8b)

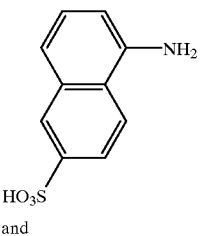 (8a)

and

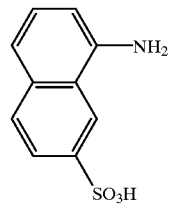 (8b)

to give the compound of the formula (9a)

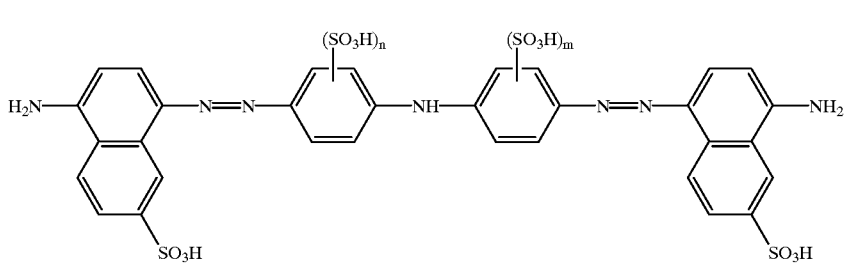

(9a)

which is asymmetric in terms of the position of the sulfo group of the aminonaphthalenesulfonic acid components.

The compound of the formula (9a) is subsequently diazotized and the product is coupled with the compounds of the formulae (10) and (11).

Compounds of the formulae (10) or (11) in which $A_1$ and $A_2$ are a radical of the formula (4)

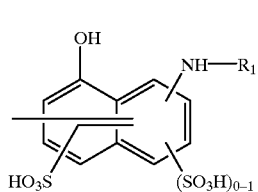

(4)

with $R_1$ defined as a radical of the formula —CO—R can be obtained, for example, by reacting a compound of the formula (5)

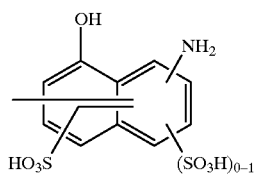

(5)

with a compound which introduces the radical $R_1$, for example the compound of the formula (13a)

Hal—$R_1$ (13a), in which Hal is halogen, such as chlorine, bromine or iodine and, in particular, chlorine.

Examples of compounds of the formula (13a) are acetyl chloride, propionyl chloride, methoxyacetyl chloride, benzoyl chloride, ethyl chloroformate and phenyl chloroformate.

Further examples of compounds which introduce the radical $R_1$, where $R_1$ is a radical of the formula —CO—R, are acetic anhydride and propionic anhydride.

The introduction of the radical $R_1$ can take place, for example, in dipolar aprotic solvents, such as dimethylformamide or dimethyl sulfoxide, or in pyridine or, preferably, in water, at a temperature of, for example, from 10 to 80° C., in particular from 10 to 50° C.

The reaction with acetic anhydride takes place in general in an aqueous medium in the presence of a base, such as an alkali metal carbonate or alkali metal hydroxide, examples being sodium carbonate, potassium carbonate and sodium hydroxide, at a temperature of, for example, from 20 to 60° C., in particular from 30 to 50° C., and at a pH of, for example, from 4 to 7, in particular from 5 to 6.

Compounds of the formula (10) or (11) in which $A_1$ and $A_2$ are a radical of the formula (4) with $R_1$ defined as a substituted or unsubstituted phenyl or naphthyl radical can be obtained, for example, by reacting a compound of the formula (5) with a compound which introduces the radical $R_1$, for example the compound of the formula (13b)

$H_2N$—R (13b), in a Bucherer reaction. The Bucherer reaction is known per se and is described in detail, for example, in Org. Reactions 1, (1942)105.

The proportion of the dyes of the formulae (1), (2) and (3) in the dye mixtures of the invention may vary within wide ranges and depends on the proportion of the coupling components of the formulae (10) and (11) that are reacted with the diazo component of the formula (9). In this case compounds of the formulae (10) and (11) are employed in a molar ratio to one another which is greater than 5:95 and less than 95:5. In this context, the compounds of the formulae (10) and (11) are preferably employed in a molar ratio of from 10:90 to 90:10, in particular in a molar ratio of from 20:80 to 80:20.

The dye mixtures of dyes of the formulae (1), (2) and (3) can also be prepared, for example, by mixing the individual dyes. This mixing process takes place, for example, in appropriate mills, for example ball mills and pinned-disc mills, and also in mixers or kneading apparatus.

The dye mixtures may additionally be prepared, for example, by spray-drying the aqueous dye mixtures.

The dye mixtures contain preferably from 5 to 95% by weight, in particular from 10 to 90% by weight, and, preferably, from 20 to 80% by weight of a dye of the formula (1), based on the overall amount of the dyes of the formulae (1), (2) and (3). With particular preference, the dye mixtures contain from 25 to 75% by weight of a dye of the formula (1), based on the overall amount of the dyes of the formulae (1), (2) and (3).

The dyes of the formulae (1), (2) and (3) of the dye mixtures of the invention which comprise a radical $A_1$ of the formula (5) and a radical $A_2$ of the formula (4) can also be obtained by first of all diazotizing a compound of the formula (7), coupling the product with a compound of the formula (8), diazotizing the resulting compound of the formula (9) and coupling the product with a compound of the formula (10) in which the radical $A_1$ is a radical of the formula (5), and subsequently reacting some of the amino groups of the radical $A_1$ of the resulting dye of the formula (2) with a compound which introduces the radical $R_1$.

The dyes of the dye mixtures of the invention are present either in the form of their free acid or, preferably, as the salts thereof.

Examples of suitable salts are the alkali metal, alkaline earth metal or ammonium salts, or the salts of an organic amine. Examples are the sodium, lithium, potassium or ammonium salts or the salt of mono-, di- or triethanolamine.

The present invention additionally provides azo dyes of the formula (12)

radicals of the formula (5) and the sum of n and m is 1, the radicals $A_1$ and $A_2$ are not simultaneously 2- or 3- or 4-amino-8-hydroxy-6-sulfonaphth-7-yl or 1-amino-8-hydroxy-3,6-disulfonaphth-7-yl.

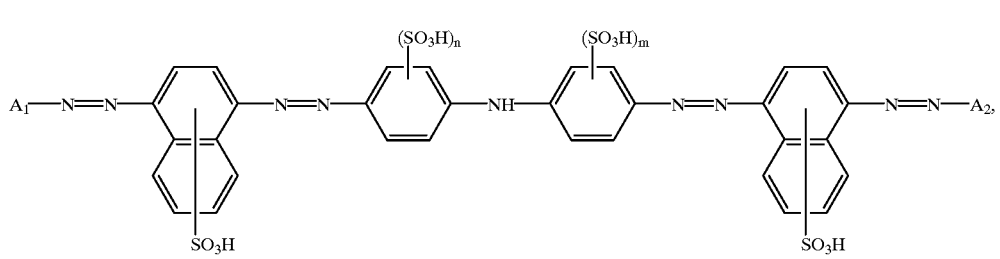

(12)

wherein $A_1$ and $A_2$ independently of one another are each a radical of the formula (4), (5) or (6)

The azo dyes of the formula (12) are, with particular preference, dyes of the formula (12a)

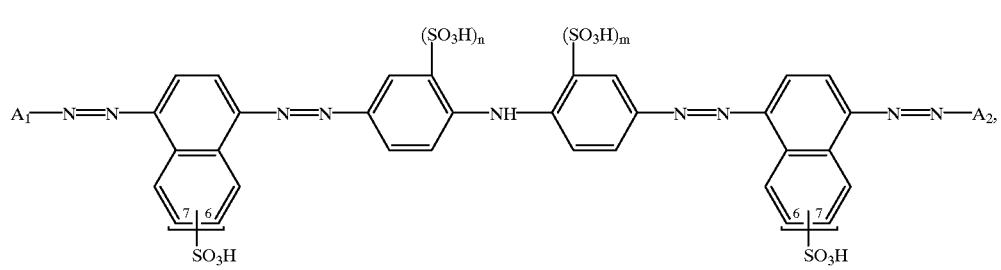

(12a)

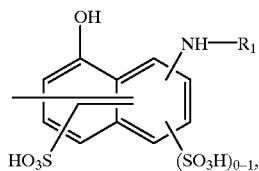

(4)

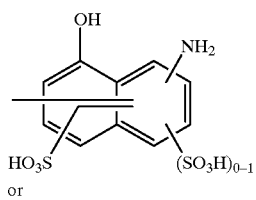

(5)

or

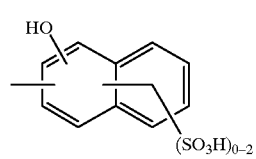

(6)

in which
$R_1$, n and m are subject to the above definitions and preferences, with the proviso that, if $A_1$ and $A_2$ are identical in which the sulfo groups of the naphthalenesulfonic acid components independently of one another are each attached in position 6 or 7, $A_1$ and $A_2$ independently of one another are each a radical of the formula (4a), (5a), (6a) or (6b)

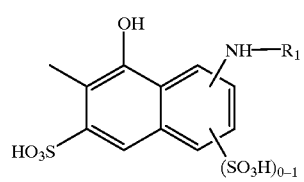

(4a)

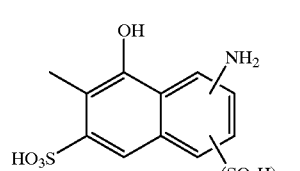

(5a)

-continued

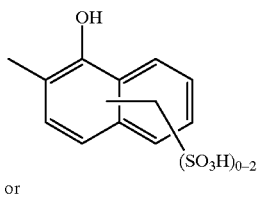
(6a)

or

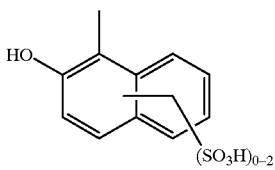
(6b)

in which $R_1$ is unsubstituted or $C_1$–$C_4$alkyl-, $C_1$–$C_4$alkoxy-, halogen- or sulfo-substituted phenyl, especially phenyl, or is a radical of formula —CO—R, where R is methyl, ethyl, methoxy, ethoxy or phenyl and the sum of n and m is 0 or 1.

In the azo dyes of the invention the radicals $A_1$ and $A_2$ have different or identical meanings.

In one particular embodiment the radicals $A_1$ and $A_2$ in the azo dyes of the invention have different meanings.

The azo dyes of the formula (12) can be obtained in principle in the same way as the dyes of the formula (1), (2) or (3) of the dye mixtures of the invention, for example by diazotizing a compound of the formula (7), coupling the product with a compound of the formula (8), diazotizing the resulting compound of the formula (9) and coupling the product with the compounds of the formulae (10) and (11). Where $A_1$ and $A_2$ are not identical the molar ratio of the compounds of the formulae (10) and (11), for example, is chosen so that the yield of the compound of the formula (1) that is asymmetrical in terms of radicals $A_1$ and $A_2$ is as high as possible, for example a molar ratio of 1:1, and the compounds of the formulae (2) and/or (3) that are symmetrical in terms of the radicals $A_1$ and $A_2$ are separated by appropriate purification methods, for example by recrystallization or reprecipitation, from the asymmetric compound of the formula (1).

The present invention also provides for the use of the dye mixtures of the invention for dyeing or printing nitrogen-containing and especially hydroxyl-containing fibre materials.

The dye mixtures of the invention are therefore suitable for dyeing and printing nitrogen-containing or, in particular, cellulosic fibre materials, preferably textile fibre materials, comprising silk, wool or synthetic polyamides, and preferably comprising cellulosic fibres, such as rayon, cotton or hemp.

In terms of their dyeing properties they can be referred to as C.I. direct dyes.

It is likewise possible to dye textile fibre materials comprising mixed fibres, for example wool/cotton, nylon/cotton, polyacrylic/cotton or, in particular, polyester/cotton blends by single-bath dyeing processes and in the presence of dyes for each different type of fibre.

The textile fibre materials can be in a very wide variety of processing states, for instance as fibre, yarn, wovens or knits.

As well as the textile substrates it is also possible to dye leather and paper with the dye mixtures of the invention.

Level dyeings are obtained in shades having good all-round fastness properties and, in particular, good rub, wet, wet-rub, perspiration and light fastness. Where necessary, the wet fastness properties, especially the wash fastness, of the resulting direct dyeings and prints can be improved substantially by aftertreatment with fixing agents.

The dye mixtures of the invention can be combined readily with other dyes, especially disperse dyes. The dye mixtures of the invention are of sufficient high-temperature stability, and so dyeing can be carried out under the dyeing conditions for polyester fibres, i.e. at temperatures in the range from about 100 to 150° C., preferably from 110 to 130° C., from an aqueous liquor and at a pH of from 4 to 7.5, preferably from 5 to 7.

It is therefore possible to employ customary disperse dyes together with the dye mixtures of the invention in a single-stage, one-bath process for dyeing polyester/cotton mixed fibres (blend fabric), the two types of fibre each being dyed by the respective dye in a uniform and colourfast way. Using a disperse dye in the same shade as the dye mixtures of the invention makes it possible, in addition, to obtain solid dyeings.

The provision of the dye mixtures of the invention allows substantial simplification of the dyeing of textile mixed fibres (blend fabrics), for example those comprising polyester fibres and cellulose fibres. The otherwise common dyeing of each type of fibre of a fibre blend in a separate operation employing different dyeing conditions is thus no longer necessary.

The examples which follow serve to illustrate the invention. Parts and percentages are by weight unless stated otherwise. The relationship between parts by weight and parts by volume is the same as that between the kilogram and the litre. The temperatures are indicated in degrees Celsius.

EXAMPLE 1

27.9 parts of 4,4'-diaminodiphenylamine-2-sulfonic acid are stirred with 400 parts of water, and 47.5 parts of concentrated hydrochloric acid are added. After cooling to 0–5° C., 58.5 parts of 4-normal sodium nitrite solution are added dropwise. After the end of diazotization, the undissolved residue is separated off by clarifying filtration. The resulting solution is added dropwise to a solution consisting of 44.6 parts of 1-aminonaphthalene-6-sulfonic acid in 600 parts of water at a pH of 8. In the course of the coupling the pH is maintained at from 8 to 8.5 by adding sodium hydroxide solution. After the end of coupling the reaction mixture is acidified and the precipitated product is filtered off. Drying gives a compound which in the form of the free acid is of the formula (101)

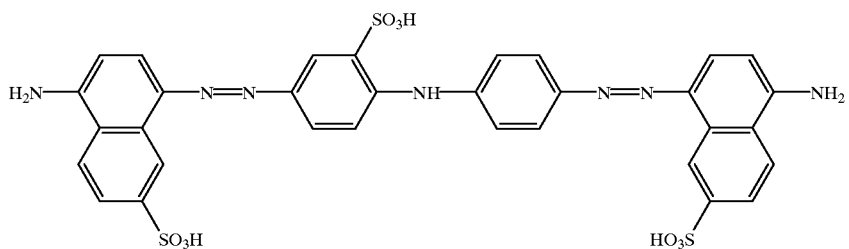
(101)

EXAMPLE 2

In the same way as described in Example 1 it is possible to use, instead of 44.6 parts of 1-aminonaphthalene-6-sulfonic acid, 44.6 parts of 1-aminonaphthalene-7-sulfonic acid as the coupling component. The compound thus prepared is, in the form of the free acid, of the formula (102)

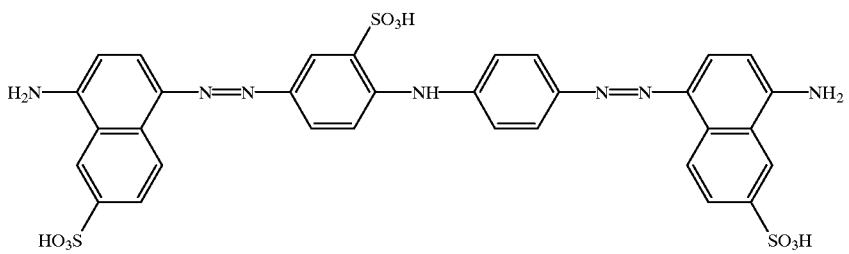
(102)

EXAMPLE 3

Using 44.6 parts of a mixture of 1-aminonaphthalene-6-sulfonic acid and 1-aminonaphthalene-7-sulfonic acid as coupling components, instead of 44.6 parts of 1-aminonaphthalene-6-sulfonic acid as described in Example 1, gives a mixture of the compounds which in the form of free acid is of the formula (101), (102), (103) and (104).

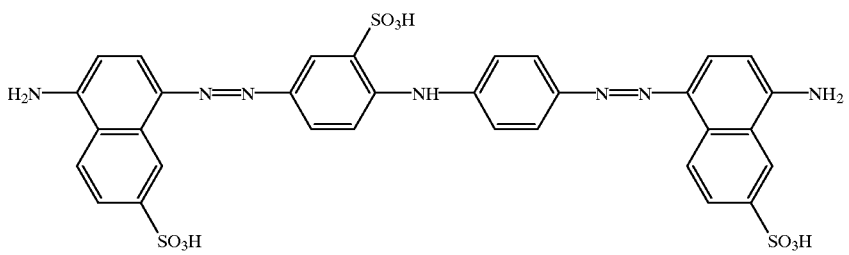
(103)

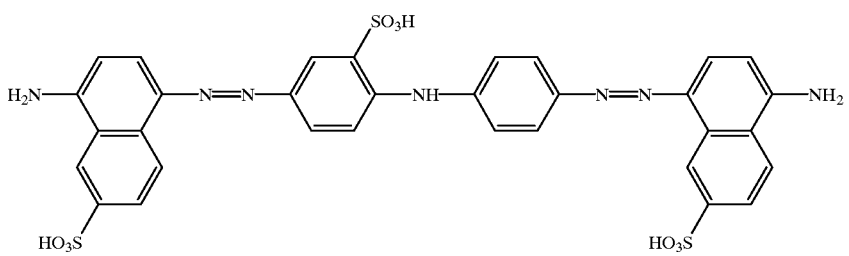

(104)

EXAMPLE 4

27.9 parts of 4,4'-diaminodiphenylamin-2-sulfonic acid are stirred with 400 parts of water, and 47.5 parts of concentrated hydrochloric acid are added. After cooling to 0–5° C., 58.5 parts of 4-normal sodium nitrite solution are added dropwise. After the end of diazotization, the undissolved residue is separated off by clarifying filtration. To this solution is added, dropwise, a solution consisting of 22.7 parts of 1-aminonaphthalene-6-sulfonic acid in 400 parts of water. The pH in the course of coupling is held at 3. Reaction is allowed to continue for 2–3 hours. Subsequently, at a pH of 6, a solution consisting of 22.7 parts of 1-aminonaphthalene-7-sulfonic acid in 400 parts of water is added dropwise and the pH is adjusted to 6 using 4-normal sodium hydroxide solution. Reaction is allowed to continue overnight. The product is precipitated by adding sodium chloride and then filtered off. Drying gives a compound which in the form of the free acid is of the formula (103).

EXAMPLE 5

Following the procedure described in Example 4 but carrying out the dropwise addition not of 22.7 parts of 1-aminonaphthalene-7-sulfonic acid in 400 parts of water but of a mixture consisting of 11.35 parts of 1-aminonaphthalene-7-sulfonic acid and 11.35 parts of 1-aminonaphthalene-6-sulfonic acid in 400 parts of water gives a mixture of compounds which in the form of the free acid are of the formulae (101) and (103).

EXAMPLE 6

22.4 parts of a compound of the formula (101) from Example 1 are dissolved in 400 parts of water at a temperature of 75° C., and 17.6 parts of 4-normal sodium nitrite solution are added. The solution is added dropwise over the course of 20 minutes and at a temperature of from 0 to 5° C. to 400 parts of ice and 14.3 parts of concentrated hydrochloric acid. The resulting brown suspension is stirred for one hour, and then its pH is adjusted to 4 using sodium carbonate solution (10%). The diazo suspension is then added dropwise over the course of 60 minutes and at a temperature of from 0 to 5° C. to a coupling solution which contains 7.2 parts of 2-amino-8-naphthol-6-sulfonic acid and 7.2 parts of 2-amino-5-naphthol-7-sulfonic acid in 400 parts of water and 63.5 parts of 1-normal sodium hydroxide solution. During coupling, the pH is held at 5. Reaction is allowed to continue for 2 hours at a temperature of from 0 to 5° C. and then overnight at room temperature. The bluish black suspension is filtered and the filter product is washed with water. The moist residue is then stirred with 1000 parts of water, and the pH is adjusted to 8 with about 67 parts of 1-normal sodium hydroxide solution. At a temperature of 60° C., 70 parts of sodium chloride are added and the fine suspension is filtered at a temperature of 50° C. Drying gives a mixture of compounds which in the form of the free acid are of the formulae (105), (106), (107) and (108)

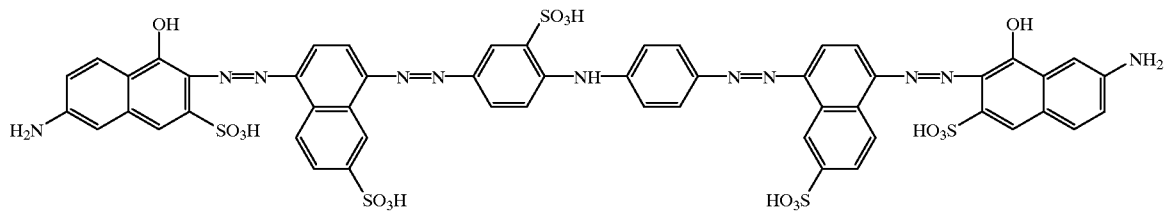

(105)

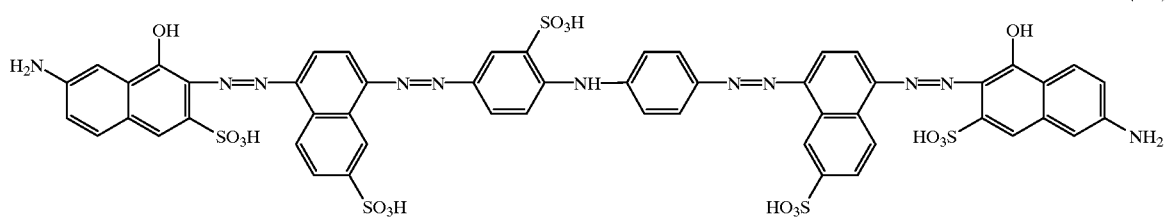

(106)

(107)

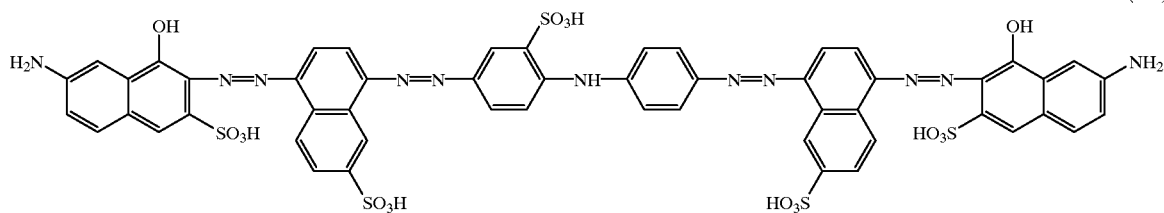

and (108)

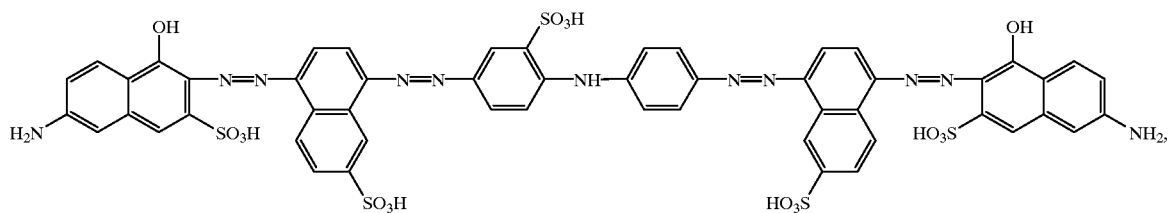

consist to the extent of about 50% by weight of the compounds of the formulae (105) and (106) and dye cotton in navy blue shades. The $\lambda_{max}$ of the dye mixture is 578 nm.

EXAMPLE 7

Following the procedure of Example 6 but using, instead of 22.4 parts of the compound of the formula (101), 22.4 parts of the compound of the formula (102) from Example 2 gives a mixture of compounds which in the form of the free acid are of the formulae (109), (110), (111) and (112)

(109)

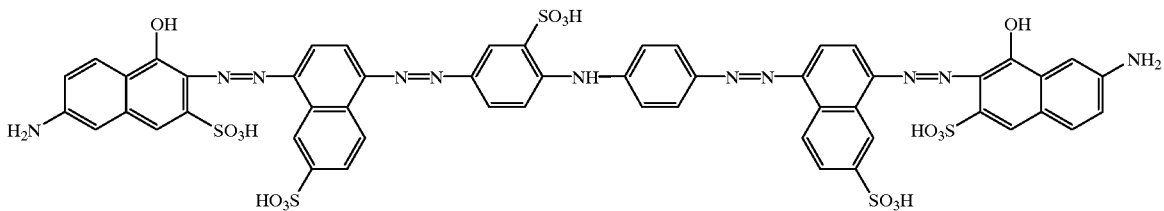

(110)

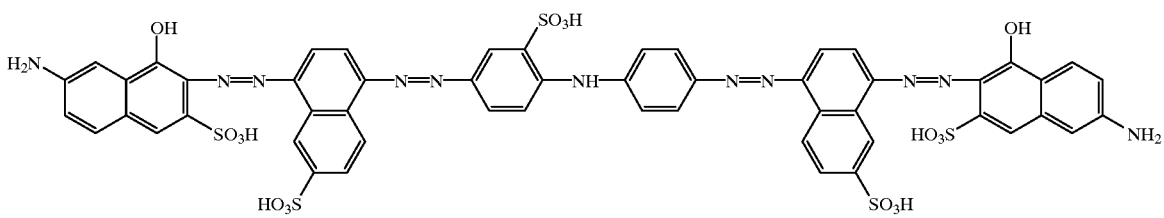

(111)

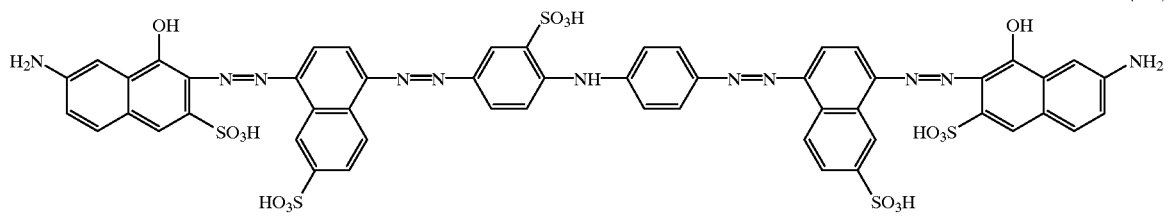

and

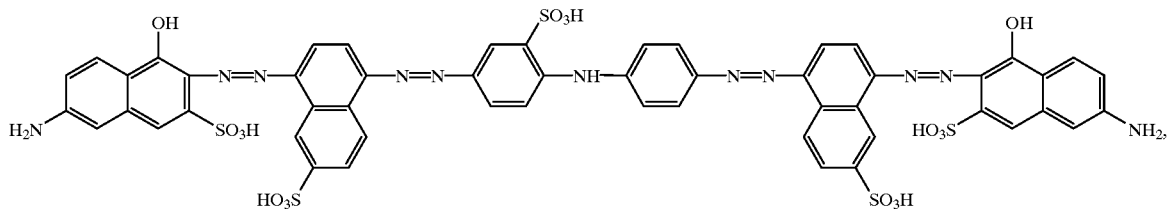

consist to the extent of about 50% by weight of the compounds of the formulae (109) and (110) and dye cotton in navy blue shades. The $\lambda_{max}$ of the dye mixture is 590 nm.

EXAMPLE 8

Following the procedure of Example 6 but using, instead of 22.4 parts of the compound of the formula (101), 22.4 parts of the compound of the formula (103) from Example 4 gives a mixture of compounds which are in the form of the free acid are of the formulae (113), (114), (115) and (116)

 (113)

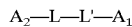 (114)

 (115)

and

 (116)

in which which consist to the extent of about 50% by weight of the compounds of the formulae (113) and (114) and dye cotton in navy blue shades.

EXAMPLE 9

Following the procedure of Example 6 but using, instead of 22.4 parts of the compound of the formula (101), 22.4 parts of the mixture of the compounds of Example 5 gives a mixture of compounds which in the form of the free acid are of the formulae (105), (106), (107), (108), (113), (114), (115) and (116), consist to the extent of about 50% by weight of the compounds of the formulae (105), (106), (113) and (114) and dye cotton in navy blue shades. The $\lambda_{max}$ of the dye mixture is 583 nm.

EXAMPLE 10

Following the procedure of Example 6 but using, instead of 22.4 parts of the compound of the formula (101), 22.4 parts of the mixture of the compounds of Example 3 gives a mixture of compounds which in the form of the free acid are of the formulae (117), (118) and (119)

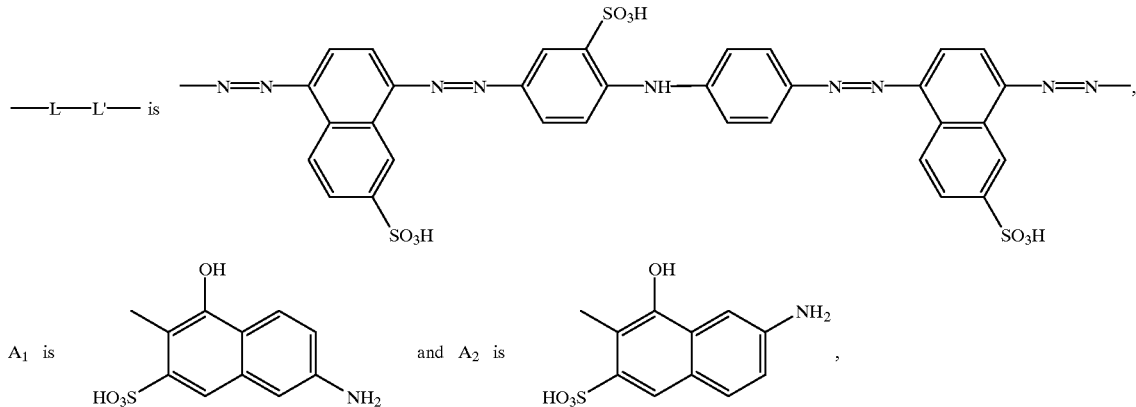

 (117)

 (118)

and

 (119)

in which

B is

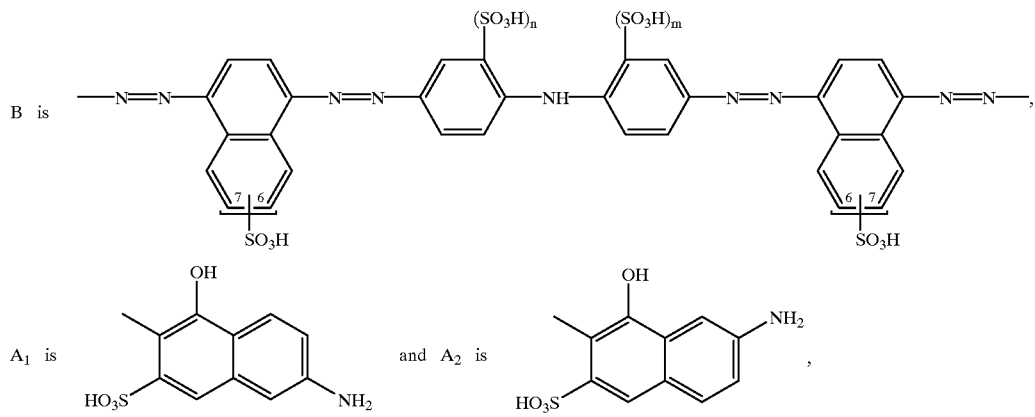

$A_1$ is [structure] and $A_2$ is [structure], the sulfo groups of the aminonaphthalenesulfonic acid components of component B independently of one another are each in position 6 or 7, and the sum of n and m is 1. The mixtures of the compounds of the formulae (117), (118) and (119) consist to the extent of about 50% by weight of the compound of the formula (117) and dye cotton in navy blue shades. The $\lambda_{max}$ of the dye mixture is 589 nm.

EXAMPLE 11

Following the procedure of Example 6 but using, instead of 7.2 parts of 2-amino-8-naphthol-6-sulfonic acid and 7.2 parts of 2-amino-5-naphthol-7-sulfonic acid, a mixture of 7.2 parts of 2-amino-5-naphthol-7-sulfonic acid and 9.9 parts of 2-phenylamino-5-naphthol-7-sulfonic acid gives a mixture of compounds which in the form of the free acid are of the formulae (120), (121), (122) and (123)

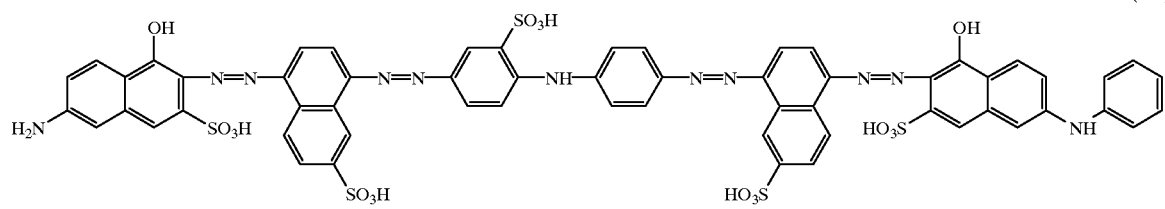
(120)

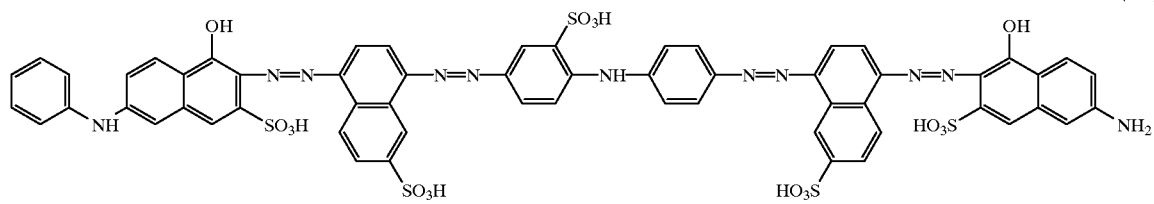
(121)

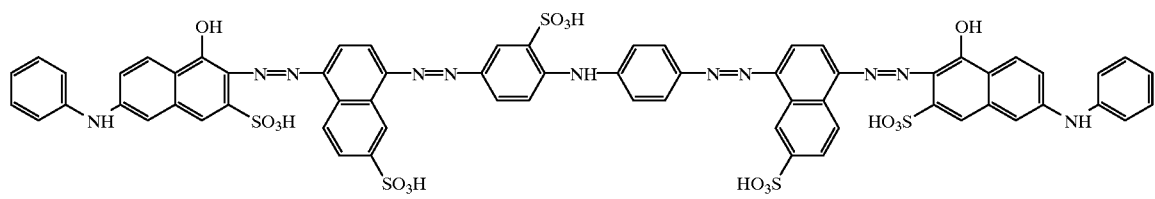
(122)

and

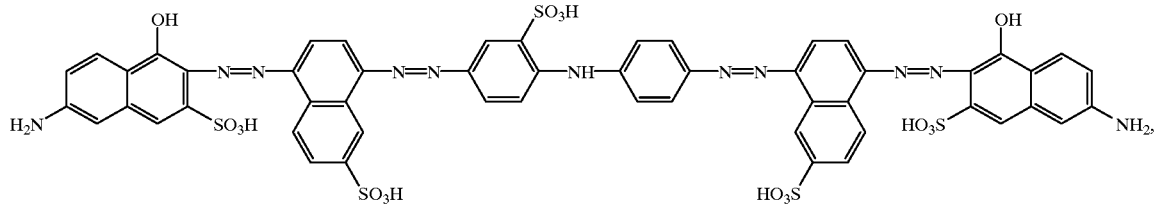
(123)

consist to the extent of about 50% by weight of the compounds of the formulae (120) and (121) and dye cotton in navy blue shades. The $\lambda_{max}$ of the dye mixture is 584 nm.

EXAMPLE 12

Following the procedure of Example 6 but using, instead of 22.4 parts of the compound of the formula (101), 22.4 parts of the mixture of the compounds of Example 5 and, instead of 7.2 parts of 2-amino-8-naphthol-6-sulfonic acid and 7.2 parts of 2-amino-5-naphthol-7-sulfonic acid, a mixture of 7.2 parts of 2-amino-5-naphthol-7-sulfonic acid and 9.9 parts of 2-phenylamino-5-naphthol-7-sulfonic acid gives a mixture of compounds which in the form of the free acid are of the formulae (120), (121), (122), (123) and (124), (125), (126) and (127)

 $A_1$—L—L'—$A_2$ (124)

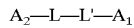 $A_2$—L—L'—$A_1$ (125)

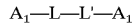 $A_1$—L—L'—$A_1$ (126)

and

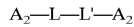 $A_2$—L—L'—$A_2$ (127)

in which which consist to the extent of about 50% by weight of the compounds of the formulae (120), (121), (124) and (125) and which dye cotton in navy blue shades. The $\lambda_{max}$ of the dye mixture is 590 nm.

EXAMPLE 13

Following the procedure of Example 6 but using, instead of 22.4 parts of the compound of the formula (101), 22.4 parts of the mixture of the compounds of Example 5 and, instead of 7.2 parts of 2-amino-8-naphthol-6-sulfonic acid and 7.2 parts of 2-amino-5-naphthol-7-sulfonic acid, a mixture of 11.5 parts of 2-amino-5-naphthol-7-sulfonic acid and 3.9 parts of 2-phenylamino-5-naphthol-7-sulfonic acid gives a mixture of compounds which in the form of the free acid are of the formulae (120), (121), (122), (123), (124), (125), (126) and (127), consist to the extent of about 33% by weight of the compounds of the formulae (120), (121), (124) and (125) and dye cotton in navy blue shades. The $\lambda_{max}$ of the dye mixture is 590 nm.

EXAMPLES 14 TO 22

Following the procedure of Example 6 but using, instead of 7.2 parts of 2-amino-8-naphthol-6-sulfonic acid and 7.2 parts of 2-amino-5-naphthol-7-sulfonic acid, the respective equimolar amount of a mixture of the coupling components indicated in Table 1 gives mixtures of compounds which in the form of the free acid are of the formulae $A_1$—B—$A_2$, $A_1$—B—$A_1$ and $A_2$—B—$A_2$ in which B is

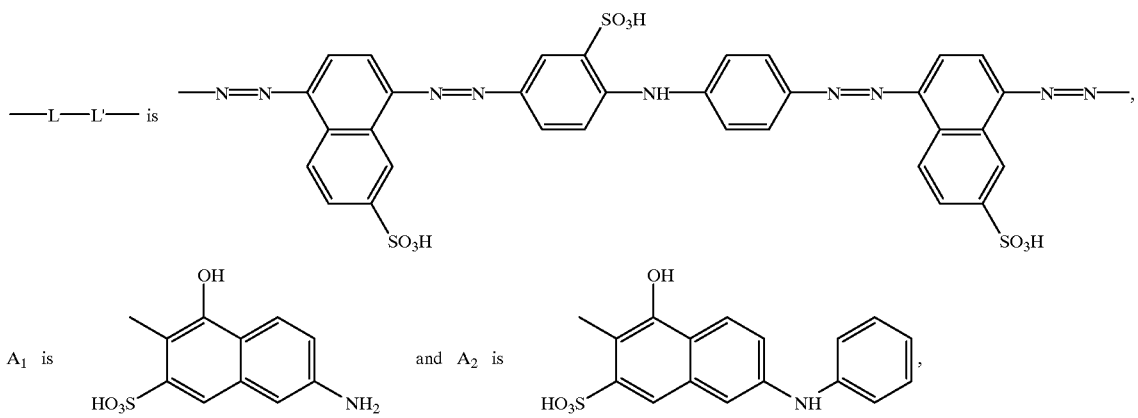

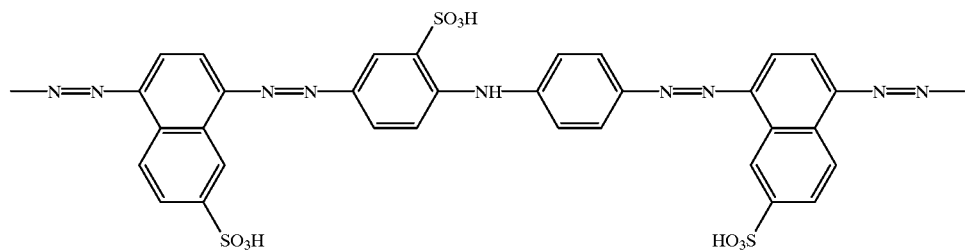

TABLE 1

| Example | A₁—H | A₂—H |
| --- | --- | --- |
| 14 | 6-hydroxy-2-naphthalenesulfonic acid (arrow at position 1) | 1-hydroxy-6-amino-3-naphthalenesulfonic acid (arrow at position 2) |
| 15 | 6-hydroxy-2-naphthalenesulfonic acid (arrow at position 1) | 1-hydroxy-6-amino-3-naphthalenesulfonic acid (arrow at position 2) |
| 16 | 6-hydroxy-2-naphthalenesulfonic acid (arrow at position 1) | 1-hydroxy-6-phenylamino-3-naphthalenesulfonic acid (arrow at position 2) |
| 17 | 7-hydroxy-2-naphthalenesulfonic acid (arrow at position 1) | 1-hydroxy-6-amino-3-naphthalenesulfonic acid (arrow at position 2) |
| 18 | 1-hydroxy-8-amino-3,6-naphthalenedisulfonic acid (arrow) | 1-hydroxy-6-amino-3-naphthalenesulfonic acid (arrow) |
| 19 | 1-hydroxy-8-amino-3,6-naphthalenedisulfonic acid (arrow) | 1-hydroxy-6-amino-3-naphthalenesulfonic acid (arrow) |

TABLE 1-continued

| Example | A₁—H | A₂—H |
|---|---|---|
| 20 | (4-acetamido-5-hydroxy-naphthalene-2,7-disulfonic acid structure) | (1-hydroxy-6-amino-naphthalene-3-sulfonic acid structure) |
| 21 | (4-benzamido-5-hydroxy-naphthalene-2,7-disulfonic acid structure) | (1-hydroxy-6-amino-naphthalene-3-sulfonic acid structure) |
| 22 | (4-phenylamino-5-hydroxy-naphthalene-2,7-disulfonic acid structure) | (1-hydroxy-6-amino-naphthalene-3-sulfonic acid structure) |

The arrow in Table 1 denotes in each case the position of coupling. The mixtures of Examples 14 to 22 dye cotton in navy blue shades.

19.7 parts of 2-phenylamino-5-naphthol-7-sulfonic acid gives a compound which in the form of the free acid is of the formula (128)

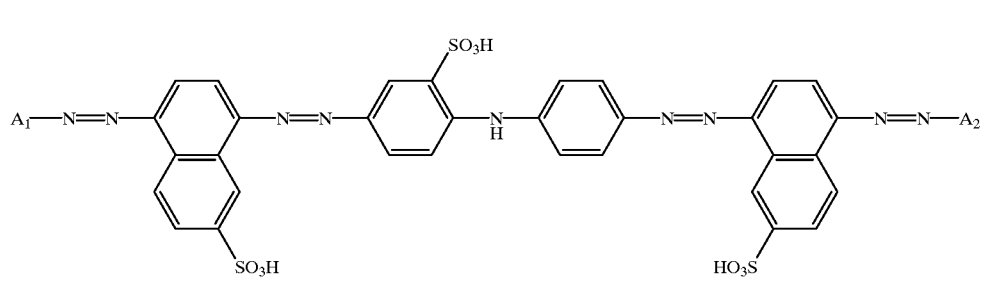

(128)

Proceeding in analogy to the indications in Examples 14 to 22 it is possible, instead of 22.4 parts of the compound of the formula (101), to use either 22.4 parts of the compound of the formula (102) of Example 2, 22.4 parts of the compound of the formula (103) from Example 4, a mixture of the compounds of the formulae (101), (102), (103) and (104) of Example 3 or a mixture of the compounds of the formulae (101) and (103) of Example 5, giving dye mixtures which dye cotton in navy blue shades.

EXAMPLE 23

Following the procedure of Example 6 but using, instead of the mixture of 7.2 parts of 2-amino-8-naphthol-6-sulfonic acid and 7.2 parts of 2-amino-5-naphthol-7-sulfonic acid, which
A₁ and A₂ are

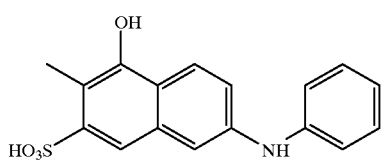

and which dyes cotton in navy blue shades.

EXAMPLES 24 to 27

Following the procedure of Example 23 but using, instead of 19.7 parts of 2-phenylamino-5-naphthol-7-sulfonic acid, an equimolar amount of the coupling components indicated in Table 2 gives compounds which in the form of the free acid, are of the formula A₁—B—A₂ in which B is

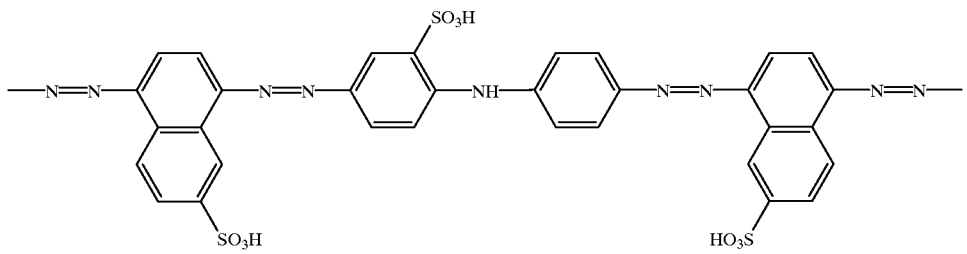

and A₁ and A₂ are identical.

TABLE 2

| Example | A₁—H = A₂—H |
|---|---|
| 24 | (2-naphthol-6-sulfonic acid structure with arrow) |
| 25 | (1-hydroxy-8-acetamido-naphthalene-3,6-disulfonic acid structure with arrow) |
| 26 | (1-hydroxy-8-benzamido-naphthalene-3,6-disulfonic acid structure with arrow) |
| 27 | (1-hydroxy-8-phenylamino-naphthalene-3,6-disulfonic acid structure with arrow) |

The arrow in Table 2 denotes in each case the position of coupling. The dyes of Examples 24 to 27 dye cotton in navy blue shades.

Proceeding in analogy to the indications in Examples 23 to 27 it is possible, instead of 22.4 parts of the compound of the formula (101), to use either 22.4 parts of the compound of the formula (102) of Example 2, 22.4 parts of the compound of the formula (103) from Example 4, a mixture of the compounds of the formulae (101), (102), (103) and (104) of Example 3 or a mixture of the compounds of the formulae (101) and (103) of Example 5, giving dyes or dye mixtures which dye cotton in navy blue shades.

Dyeing Instructions 1

10 parts of cotton fabric (bleached and mercerized) are introduced at about 30° C. into a dye bath containing 200 parts of water and 0.2 part of the dye mixture of Example 5. The liquor is heated to 95° C. over the course of 30 minutes and is left at this temperature for 15 minutes. Then 4 parts of sodium sulfate are added and dyeing is continued at 95° C. for 45 minutes. The dye bath is then cooled to 80° C. over the course of 15 minutes and is left at this temperature for 15 minutes more. The dyeing is then rinsed thoroughly with cold water and dried.

Dyeing Instructions 2

10 parts of a 50:50 fibre blend of polyester and cotton are introduced at about 50° C. into a dye bath containing 200 parts of water, a dye mixture consisting of 0.1 part of C.I. Disperse Blue 79 and 0.1 part of the dye mixture of Example 5, 0.4 part of ammonium sulfate and 0.2 part of an anionic dispersant (e.g. formaldehyde condensation product of naphthalenesulfonic acid). The dye bath is adjusted with formic acid to a pH of 5.5, 2 parts of sodium sulfate are added, and then the bath is heated to about 130° C. over the course of 45 minutes. Dyeing is continued at 130° C. for 45 minutes, then the dye bath is cooled to about 80° C. over the course of 30 minutes and is left at this temperature for a further 45 minutes. The dyeing is then rinsed thoroughly with cold water and dried.

Dyeing Instructions 3

The procedure of dyeing instructions 1 or 2 is followed except that, after the end of the dyeing process, the cold-rinsed dyeing is placed in a fresh bath which is at a temperature of about 30° C. and contains 200 parts of water and 0.2–0.6 part of a cationic aftertreatment agent (amine-formaldehyde-dicyandiamide condensation product or preparation based on dicyandiamide and diethylenetriamine). The dyeing is aftertreated at 30° C. for 30 minutes and then dried without a further rinsing process; a dyeing having improved wet fastness properties is obtained.

Dyeing Instructions 4

The procedure of dyeing instructions 1 or 2 is followed except that, after the end of the dyeing process, the cold-rinsed dyeing is placed in a fresh bath which is at a temperature of about 25° C. and contains 200 parts of water, 1 part of sodium sulfate and 0.6 part of a fibre-reactive cationic aftertreatment agent based on N-methyldialkylamine and epichlorohydrin. The temperature is raised to 40° C. over the course of 15 minutes, 0.8 part of 30% sodium hydroxide solution is added, and the dyeing is treated at 40° C. for a further 45 minutes. The dyeing is finally hot-rinsed and dried; it features improved wet fastness properties.

What is claimed is:

1. A dye mixture comprising at least one dye of the formula (1)

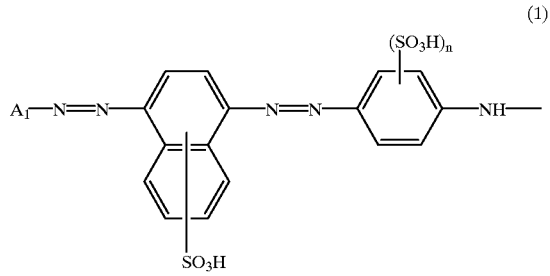
(1)

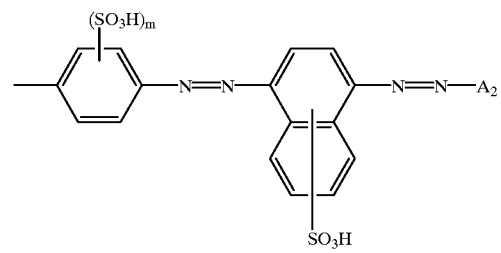

together with at least one dye of the formula (2) or (3)

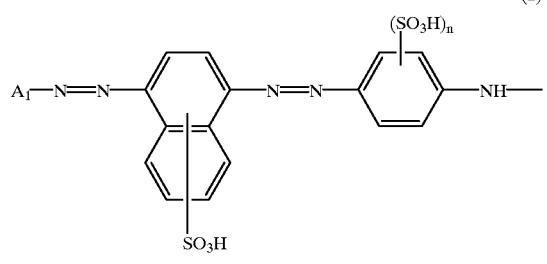
(2)

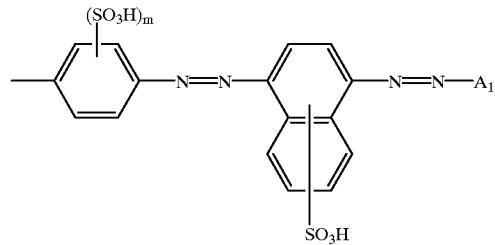

or

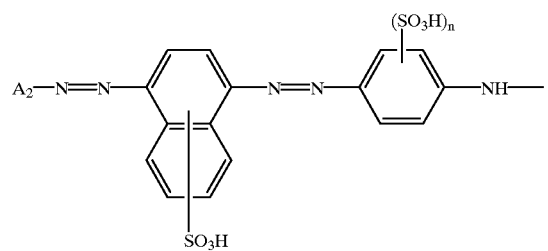
(3)

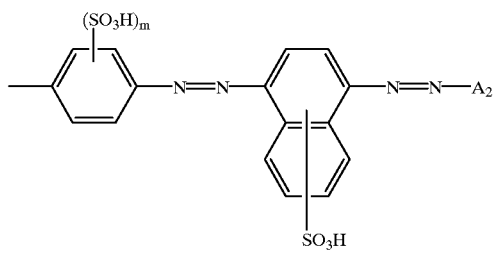

in which $A_1$ and $A_2$ are different from each other and independently of one another are each the radical of a coupling component of the benzene or naphthalene series or of the heterocyclic series and n and m are 0 or 1.

2. A dye mixture according to claim 1, wherein $A_1$ and $A_2$ independently of one another are each a radical of the formula (4), (5) or (6)

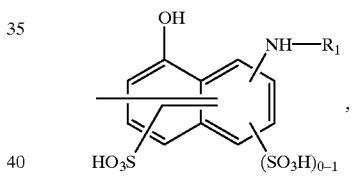
(4)

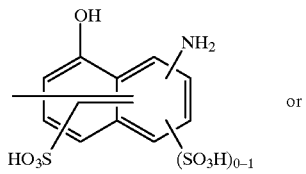
(5)

or

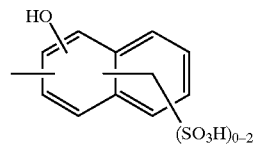
(6)

in which $R_1$ is unsubstituted or substituted phenyl or naphthyl or is a radical of formula —CO—R, where R is unsubstituted or substituted $C_1$–$C_6$alkyl, $C_1$–$C_6$alkoxy, $C_5$–$C_7$cycloalkyl, phenyl, phenoxy or naphthyl.

3. A dye mixture according to claim 2, wherein

R is unsubstituted or hydroxyl-, $C_1$–$C_4$alkoxy-, sulfo-, sulfato- or halogen-substituted $C_1$–$C_6$alkyl or $C_1$–$C_6$alkoxy; unsubstituted or $C_1$–$C_4$alkyl- or halogen-substituted $C_5$–$C_7$cycloalkyl, or unsubstituted or $C_1$–$C_4$alkyl-, $C_1$–$C_4$alkoxy-, sulfo- or halogen-substituted phenyl, phenoxy or naphthyl.

4. A dye mixture according to claim 2, wherein

R is unsubstituted or hydroxyl-, $C_1$–$C_4$alkoxy- or halogen-substituted $C_1$–$C_6$alkyl or $C_1$–$C_6$alkoxy or is unsubstituted or $C_1$–$C_4$alkyl-, $C_1$–$C_4$alkoxy-, sulfo- or halogen-substituted phenyl or phenoxy.

5. A dye mixture according to claim 2, wherein

R is $C_1$–$C_4$alkyl, $C_1$–$C_4$alkoxy or phenyl.

6. A dye mixture according to claim 2, wherein $R_1$ is unsubstituted or $C_1$–$C_4$alkyl-, $C_1$–$C_4$alkoxy-, $C_2$–$C_4$alkanoylamino-, nitro-, halogen-, carboxy- or sulfo-substituted phenyl or naphthyl or is a radical of the formula —CO—R, where R is unsubstituted or hydroxyl-, $C_1$–$C_4$alkoxy- or halogen-substituted $C_1$–$C_6$alkyl or $C_1$–$C_6$alkoxy or is unsubstituted or $C_1$–$C_4$alkyl-, $C_1$–$C_4$alkoxy-, sulfo- or halogen-substituted phenyl or phenoxy.

7. A dye mixture according to claim 2, wherein $R_1$ is unsubstituted or $C_1$–$C_4$alkyl-, $C_1$–$C_4$alkoxy-, halogen- or sulfo-substituted phenyl, or is a radical of the formula —CO—R, where R is $C_1$–$C_4$alkyl, $C_1$–$C_4$alkoxy or phenyl.

8. A dye mixture according to claim 1, wherein $A_1$ and $A_2$ independently of one another are each a radical of the formula (4a), (5a), (6a) or (6b)

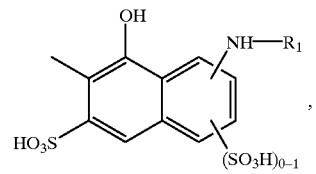
(4a)

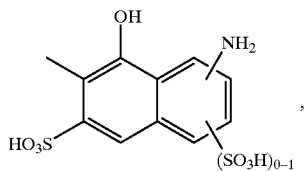
(5a)

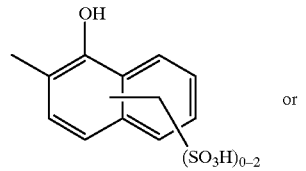
(6a)

or

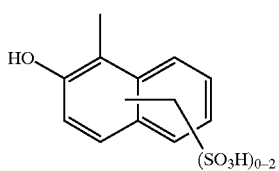
(6b)

in which $R_1$ is unsubstituted or substituted phenyl or naphthyl or is a radical of the formula —CO—R, where R is unsubstituted or substituted $C_1$–$C_6$alkyl, $C_1$–$C_6$alkoxy, $C_5$–$C_7$cycloalkyl, phenyl, phenoxy or naphthyl.

9. A dye mixture according to claim 1, comprising, at least one dye of the formula (1a)

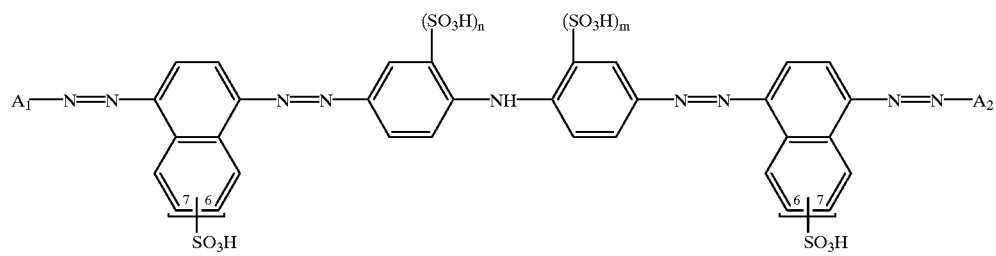
(1a)

together with at least one dye of the formula (2a) or (3a)

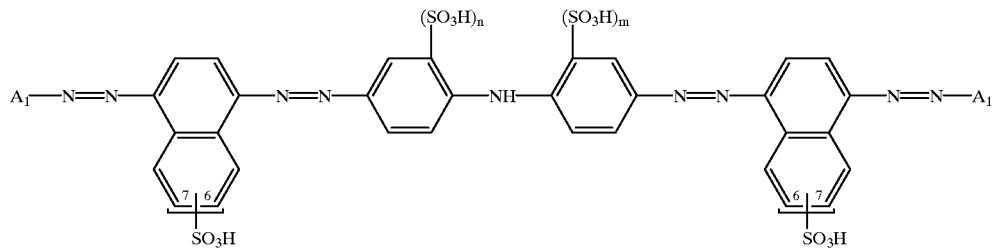

(2a)

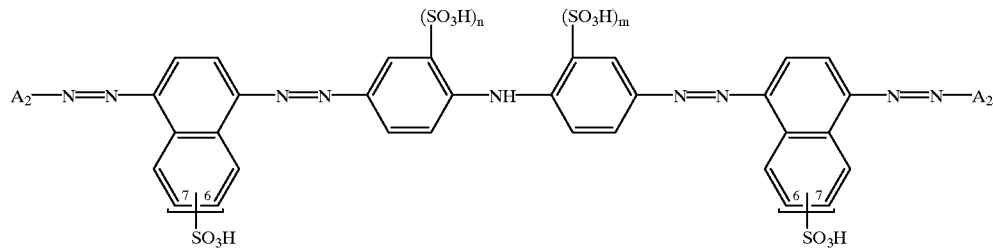

(3a)

in which the sulfo groups of the naphthalenesulfonic acid components independently of one another are each attached in position 6 or 7, $A_1$ and $A_2$ are different from each other and independently of one another are each a radical of the formula (4a), (5a), (6a) or (6b), $R_1$ is unsubstituted or $C_1$–$C_4$alkyl-, $C_1$–$C_4$alkoxy-, halogen- or sulfo-substituted phenyl, or is a radical of the formula —CO—R, where R is methyl, ethyl, methoxy, ethoxy or phenyl, and the sum of n and m is 0 or 1.

10. A dye mixture according to claim 9, wherein $A_1$ and $A_2$ independently of one another are each a radical of the formula (4a), (5a) or (6b), $R_1$ is phenyl or a radical of the formula —CO—R, where R is methyl, ethyl or phenyl.

11. A dye mixture according to claim 9, comprising at least one dye of the formula (1a) together with at least one dye of the formula (2a) and at least one dye of the formula (3a).

12. A process for preparing a dye mixture according to claim 1, which comprises diazotizing a compound of the formula (7)

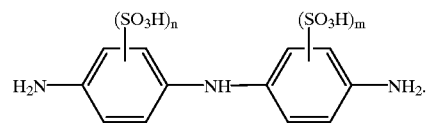

(7)

coupling the product with a compound of the formula (8)

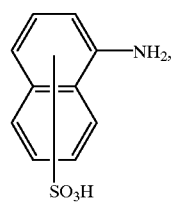

(8)

diazotizing the resulting compound of the formula (9)

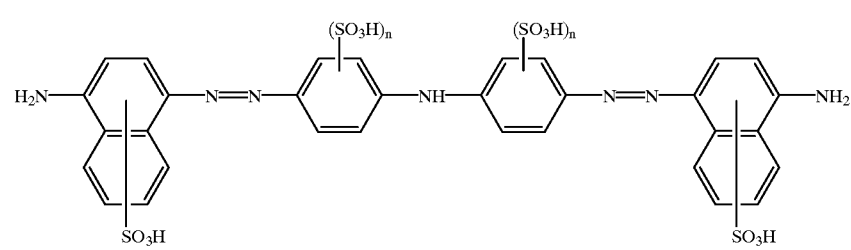

(9)

and coupling the product with the compounds of the formulae (10) and (11)

$$A_1\text{—}H \tag{10}$$

and $$A_2\text{—}H \tag{11}$$

where $A_1$, $A_2$, n and m are each as defined in claim 1.

13. A process for dyeing and printing nitrogen-containing or hydroxyl-containing fibre material, which comprises applying to said fibre material a tinctorial amount of a dye mixture according to claim 1.

14. A process according to claim 13 wherein a blend of synthetic fibres and cellulosic fibre material is dyed in the presence of a disperse dye for the polyester fibres under the dyeing conditions for polyester fibres.

15. A process for dyeing a polyester/cotton blend with disperse and direct dyes, which comprises using, in addition to the disperse dyes, a dye mixture according to claim 1, in a single-stage, one-bath process and dyeing from an aqueous liquor at temperatures in the range from 100 to 150° C. and at a pH of between 4 and 7.5.

* * * * *